Figure 1:
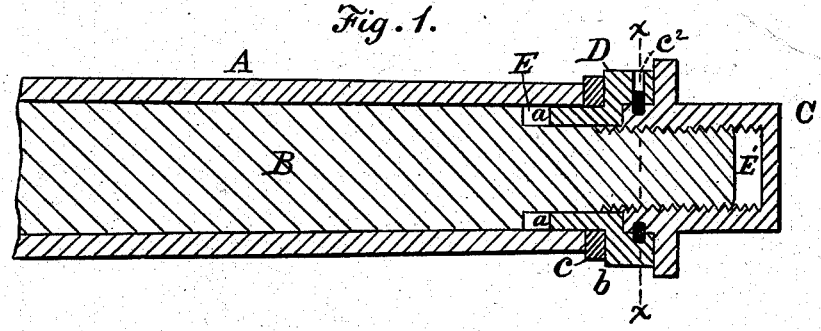

(No Model.)

M. E. BURRIS.
VEHICLE AXLE.

No. 278,396.  Patented May 29, 1883.

Witnesses:
G. B. Towles.
William S. Poulter.

Inventor:
M. E. Burris
By W. Burris
Attorney.

UNITED STATES PATENT OFFICE.

MICAJAH E. BURRIS, OF BROOKLYN, NEW YORK.

VEHICLE-AXLE.

SPECIFICATION forming part of Letters Patent No. 278,396, dated May 29, 1883.

Application filed March 14, 1883. (No model.)

*To all whom it may concern:*

Be it known that I, MICAJAH E. BURRIS, a citizen of the United States of America, residing at Brooklyn, in the county of Kings and State of New York, have invented certain new and useful Improvements in Nuts and Sleeves Used upon Vehicle-Axles, of which the following is a specification, reference being had therein to the accompanying drawings.

This invention is designed as improvements on my vehicle-axle nut and sleeve patented January 30, 1883, and March 6, 1883; and these improvements consist in the construction of the spindle and the sleeve, so that the inner end of the sleeve extends into the end of the axle-box, and in connecting the sleeve and nut together by means of Babbitt metal or other suitable material run in a fused state into annular grooves in the sleeve and nut, and in locking the nut by means of a screw having threads running in the reverse direction of the screw-threads on the spindle and nut, as hereinafter fully described, and as shown in the drawings, in which—

Figure 2:
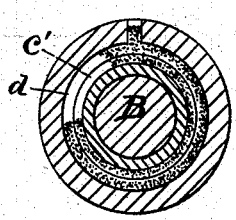
Figure 3:
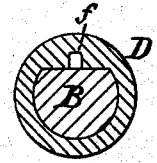
Figure 4:
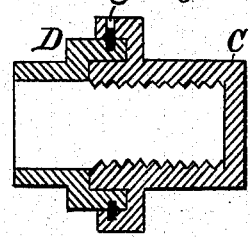
Figure 5:
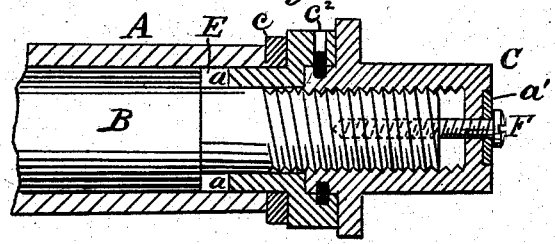

Figure 1 is a longitudinal section of a portion of an axle-box and spindle having my improvements. Fig. 2 is a transverse section on line $x\,x$ of Fig. 1. Fig. 3 is a sectional view, showing a modification of the form of the spindle and sleeve. Fig. 4 is a modification of the construction of the nut and sleeve. Fig. 5 is the same view as Fig. 1, showing the nut locked by means of a screw with threads running the reverse of the threads on the spindle and nut.

A B C represent, respectively, the axle-box, spindle, and nut.

D represents my non-revoluble sleeve, having its forward end, $a$, constructed to extend in the end of the axle-box, and having a shoulder at $b$ to form the bearing for the washer $c$, inserted between the shoulder and the end of the axle-box. The outer end of the sleeve is constructed similar to that shown in above-named patent of March 6, 1883.

Instead of attaching the sleeve and nut by pins inserted through the sleeve into a groove in the hub of the nut, as set forth in the above-named patent, I make an annular groove, $c'$, in the inner walls of the sleeve precisely opposite, and corresponding in size with the annular groove $d$ in the hub of the nut, and the sleeve is provided with an orifice, $c^2$, leading into the grooves, which are filled with melted Babbitt metal or other suitable materials poured in a fused state through the orifice into the grooves. The Babbitt metal will not ordinarily adhere to the walls of the grooves, so as to prevent the nut from being turned; but, if necessary to prevent this, the nut may be revolved slightly in the sleeve before the Babbitt metal is entirely cooled. The Babbitt metal fills completely the grooves, and holds the nut and sleeve together so closely as to prevent any play or rattling.

E represents a space between the end of the sleeve and the shoulder on the spindle, and $E'$ represents a space between the end of the spindle and nut to allow the wear on the washer to be taken up.

It is well known that Babbitt metal fuses at a very low degree of heat. Hence, whenever desirable, the nut and sleeve may be readily separated by exposing them to a heat which will readily melt the Babbitt metal without affecting the nut or sleeve.

Instead of rendering the sleeve non-revoluble by means of the groove in the spindle and a feather on the sleeve, as set forth in my former patents, the spindle and sleeve D (shown in cross-section) may be made as shown in Fig. 3 of the drawings, which shows a groove, $f$, to conduct oil from the nut to the spindle.

It is evident that the sleeves and nuts set forth in my former patents may be attached together by means of the Babbitt metal in annular grooves in the sleeves and nuts. The nut may be locked, if found necessary and desirable, by means of a screw, F, extended through a threaded hole in the end of the nut into a threaded hole in the spindle, the threads on the screw and the hole in the nut and in the spindle running in the reverse direction of the screw-threads on the nut and spindle. For example, my improved nuts and spindles having right-hand screw-threads, the locking-screws and the holes in the nut and spindle are made with left-hand threads. The nut may be provided with an annular recess to receive the washer $a'$. The nut being screwed up to its place, the screw F is then inserted, locking the nut, so that it cannot be run off or set up without turning in or out, as may be required.

The screw is made to fit so tightly in its bearings as not to be liable to become unscrewed by the jarring motion of the vehicle.

I claim as my invention—

1. The combination of a vehicle-axle nut C, and sleeve D, each having an annular groove, and attached together by means of Babbitt metal or other suitable material, run in a fused state into the annular grooves, substantially as and for the purposes described.

2. The sleeve D, having its inner end, $a$, adapted to extend into the end of the axle-box, and provided with the washer-shoulder $b$, in combination with the axle-nut C, attached to the sleeve, substantially as and for the purposes described.

In testimony whereof I affix my signature in presence of two witnesses.

MICAJAH ELLIOTT BURRIS.

Witnesses:
F. A. BABCOCK,
J. F. CLARKSON.